United States Patent
Jungk et al.

(10) Patent No.: US 6,695,949 B1
(45) Date of Patent: Feb. 24, 2004

(54) FEEDING DEVICE FOR STRIP SHAPED TIRE COMPONENTS

(75) Inventors: Andreas Jungk, Wedemark (DE); Gerd Morig, Seelze (DE); Hubert Ringhoff, Seelze (DE)

(73) Assignee: Continental Aktiengesellschaft (DE)

( * ) Notice: Subject to any disclaimer, the term of this patent is extended or adjusted under 35 U.S.C. 154(b) by 163 days.

(21) Appl. No.: 10/069,319

(22) PCT Filed: Aug. 16, 2000

(86) PCT No.: PCT/EP00/07944

§ 371 (c)(1),
(2), (4) Date: Feb. 19, 2002

(87) PCT Pub. No.: WO01/12423

PCT Pub. Date: Feb. 22, 2001

(30) Foreign Application Priority Data

Aug. 16, 1999 (DE) .......................................... 199 38 149

(51) Int. Cl.$^7$ ............................................. B29D 30/38
(52) U.S. Cl. ................... 156/406.4; 156/124; 156/130; 156/133; 156/405.1; 83/155; 83/486.1; 198/690.1; 198/861.1
(58) Field of Search ................................. 156/124, 126, 156/128.1, 130, 133, 405.1, 406.4; 83/155, 434, 486, 486.1; 271/193; 198/679, 690.1, 861.1

(56) References Cited

U.S. PATENT DOCUMENTS

| | | | | |
|---|---|---|---|---|
| 1,944,389 A | * | 1/1934 | Abbott, Jr. .................. | 156/132 |
| 3,071,179 A | * | 1/1963 | Tourtellotte et al. ...... | 156/380.2 |
| 3,813,974 A | * | 6/1974 | Friberg et al. ............... | 83/155 |
| 4,409,872 A | * | 10/1983 | Bertoldo ..................... | 83/155 |
| 4,596,617 A | * | 6/1986 | Ishii .......................... | 156/130.3 |
| 4,769,104 A | * | 9/1988 | Okuyama et al. ........ | 156/406.4 |
| 4,961,813 A | * | 10/1990 | Bailey ....................... | 156/406.4 |
| 5,059,268 A | * | 10/1991 | Satoh et al. ............. | 156/130.3 |

FOREIGN PATENT DOCUMENTS

| | | |
|---|---|---|
| DE | 1904481 | 8/1970 |
| EP | 0 384 083 | 8/1990 |
| EP | 0454094 | 10/1991 |
| EP | 0 464 862 | 1/1992 |
| EP | 0 482 830 | 4/1992 |
| FR | 2 496 616 | 6/1982 |

* cited by examiner

Primary Examiner—Mark A. Osele
(74) Attorney, Agent, or Firm—R W Becker & Associates; R W Becker

(57) ABSTRACT

The invention relates to a feeding device for strip-shaped tire components. The inventive device is situated in a conveying device for a tire construction drum. The feeding device comprises one or several storage means, feeding and cutting devices pertaining thereto as well as transport devices by means of which the cut tire components are transported to the tire construction drum. The transport devices which withdraw the tire component from the storage means and position said tire component under the cutting device and the transport devices which transport the cut tire component to the tire construction drum are configured as an interconnected one-piece transport system in a transport line. The transport system can be displaced between a rear cutting and feeding position and a support position that is moved to the front. The conveying devices are arranged in such a way that the one-piece transport system engages with the cutting devices in the rear position thereof. The conveying devices and the one-piece transport system are provided with holding and fixing devices for the tire component. The holding and fixing devices can be carried to the tire component and fix the tire component during displacement of the one-piece transport system, whereby said component has been withdrawn from the storage means and, after cutting, remains adjacent to the storage means in relation to the cutting line. Said holding and fixing devices also fix the tire component that is already fed to the one-piece transport system.

9 Claims, 3 Drawing Sheets

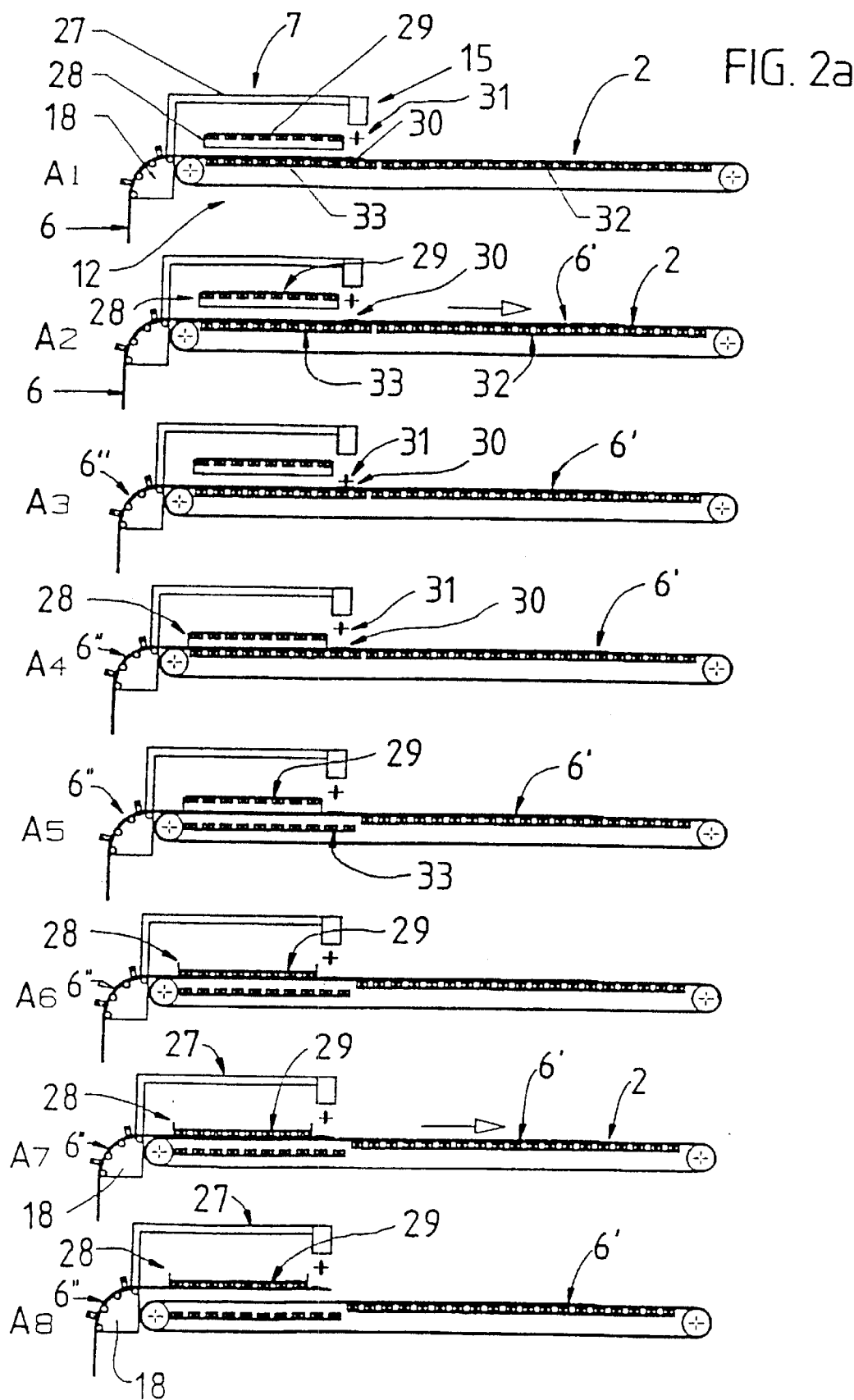

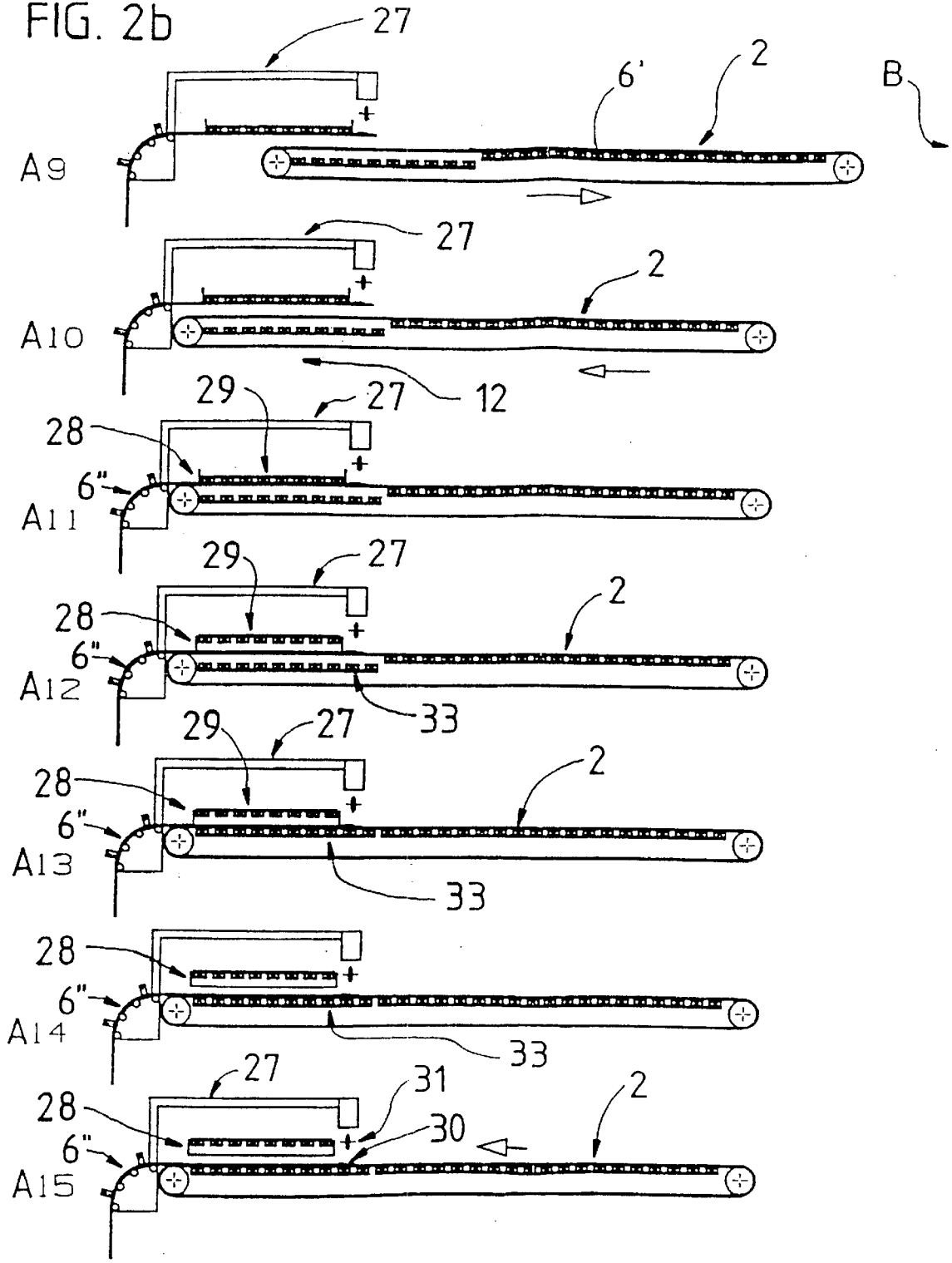

FEEDING DEVICE FOR STRIP SHAPED TIRE COMPONENTS

BACKGROUND OF THE INVENTION

The invention relates to a feed device for strip-shaped tire components within a conveying apparatus (servicer) for a tire build-up drum, especially for a belt drum for the assembly of the belt package, whereby successively placed and rolled onto the tire build-up drum are a plurality of plies of different or differently pre-treated, essentially strip-shaped tire components that are bonded to the already applied materials, whereby the conveying apparatus is provided with a) one or more storage means, preferably a drum storage means, as well as appropriate pertaining feed devices for the tire component, as well as b) one or more cutting devices associated with the feed devices for cutting the strip-shaped tire component to length, whereby the conveying apparatus is furthermore provided with one or more conveying lines/conveying paths in which the cut tire components are conveyed to the tire build-up drum.

In the classic manufacture of a new tire with a carcass built-up in a flat manner, the inner liner or inner plate of a tire, and the sidewalls, are first applied to a carcass build-up drum having a horizontal axis of rotation, and are rolled onto the circumference of the drum, as a result of which the still unvulcanized rubber materials are adhered together, as also occurs during the still later applied tire components or tire materials, depending upon need.

Subsequently, especially with truck or commercial vehicle tires, bead-reinforcing profiles are applied, for example so-called "chafers", which can also be provided with textile or metallic load-carrying members, and are conventionally arranged in such a way that in the finished tire at least one carcass ply is disposed between the core and the chafer.

Furthermore, generally one or two carcass plies are applied that are comprised of rubberized textile or metallic load-carrying means. Depending upon need, there then follows the application of shoulder-filling profiles (shoulder pads) that in the finished tire have the function of providing a compensation between the belt contour, which is also flat at its edges, and the more greatly curved carcass contour at the belt edges.

Subsequently, with the aid of a carcass carrying and core-centering device, the bead cores, which are conventionally already provided with core sliders, are pushed and positioned over the drum. Bead core and core slider (apex) are hereby already present as a prefabricated unit that is produced on a separate drum (extensible drum) and are placed as prefabricated rings from the side over the plies that are already present on the tire build-up drum.

When the build-up drum is subsequently expanded, the prefabricated bead cores and the flat carcass are pressed radially against one another, so that the inner surfaces of the bead cores are adhered and connected with the outer carcass surface.

The drum is thereafter drawn together to a smaller diameter, and the carcass with the set bead cores—again with the aid of the carcass carrying and core centering device—is withdrawn from the drum and transferred to the expansion drum.

Parallel to the fabrication of the carcass, applied to a belt build-up drum in the separate belt manufacturing line are the belt plies, which in general are two or three, and with the manufacture of truck tires generally four rubberized steel cord plies; if desired, one or two plies of a nylon band can be provided. Belt cushion strips can be disposed between the individual belt plies. Finally, applied to this belt structure is the tread strip, which can be provided with an underplate.

A movable belt carrying device for accommodating the prefabricated belt package transports the thus resulting belt/tread strip structure to the expanding drum having the already centered, fixed and pre-expanded tire carcass, and positions this structure over the tire carcass.

This is now completely expanded and joined with the belt package, whereby with the expansion (bulging) of the carcass, the folding process is also effected, according to which the carcass ply ends are folded about the bead cores and the side portions are folded up. This process is carried out with the aid of bellows, whereby a center bellows expands the central portion of the carcass and side expansion bellows, in other words expansion bellows, which engage axially beyond the set cores, are used for folding up the side portions, possibly aided by presser rings (pushers), etc.

After the expansion and the connection of the carcass with the belt package, the belt carrying device is removed and the tread strip is rolled on together with the belt package.

After the deflating or release of the expansion bellows, the fabricated green tire is then removed from the expansion drum by further transfer devices and is vulcanized in an appropriate vulcanization mold, where it thus obtains its final shape with a molded tread strip profile, possibly also with sidewalls that contain writing and/or decoration.

Especially at the stations of the tire manufacturing, i.e. the manufacturing plant, at which a plurality of strip-shaped tire components are placed directly or at successive intervals on a tire build-up drum, in other words, for example, during the placement of four successive rubberized belt plies upon the belt build-up drum of a truck tire manufacturing, to facilitate and automate the manufacturing process so-called conveying apparatus or "servicers" are operated which, generally with a plurality of transport and cutting devices, transport the strip-shaped tire components from a plurality of storage means, cut them to length and at prescribed angles, transport them to the build-up drum, and there place them upon the already applied materials or components.

As storage means for strip-shaped tire components, these days generally coil or drum storage means/storage cassettes or modules are used in which the material needed for the tire components is placed in rolls and can be withdrawn over appropriate feed paths and via feed devices by means of the transport devices of the conveying apparatus. The storage means are hereby disposed directly on the conveying apparatus. The roller accommodating means/the roller bearing is generally driven in order to avoid tension on the material during withdrawal. In this connection, there are generally provided between the storage means and the transport devices compensation loops of the material that also serve this purpose and compensate for differences in speed between the roller drive and the transport device.

As a consequence of the number of storage means, or the number of the successively to be applied strip-shaped tire components, a corresponding number of required feed devices result within the feed path for the tire component. Thus, with a conveying apparatus for four rubberized belt plies upon the belt build-up drum of a truck tire manufacturing, in conformity with the four storage means for variously built-up belt ply materials, four feed devices are also required for the tire component.

At or under the cutting devices that are associated with the feed devices, transport lines begin that, from the spatially differently arranged feed devices/cutting devices, all must lead to the same destination, namely to the tire build-up drum, or to the point of application for the tire components that is disposed on the periphery of the tire build-up drum.

In this connection, with the tire components of still unvulcanized rubber materials used for the tire manufacture, for example with the belt plies that comprise rubberized load-carrying means, there exists the requirement for conveying the tire component without stretching, bending and other deformations, in other words in as flat a support as possible on a planar surface, to the tire build-up drum. The transport lines should therefore contain to the extent possible no bends or curves for guiding the tire components, and must have transport devices that convey the tire component in as flat a support as possible and exclusively in a linear direction from the locally/spatially separated feed devices to a point of application upon the tire build-up drum that is the same for all tire components.

The state of the art resolution of this problem is that the transport devices that are associated with each transport line are embodied, generally in three parts, as circulating/continuous conveyor belts having an upper run that is as planar as possible. In this three-part construction, each of the transport devices, starting from the feed device, in other words from the introduction of the tire component from the storage means, has a transport device, associated with the feed device, for the withdrawal of the tire component from a storage means and for the positioning of the tire component in or under a cutting device (feed band), a further transport device for transporting the cut tire component from the cutting position to the tire build-up drum (drum feed band), as well as a transport device for the placement of the cut tire component upon the built-up drum (transfer band).

In this connection, the feed band that is associated with the feed device is only relatively short, is stationary and overlaps a region of the transport line from the introduction of the tire component that is customarily effected via guiding and conducting devices that are embodied as roller systems, up to the cutting device, in which on a rail that slides on a feed band the tire component is cut with a roller-type blade.

The subsequent transport device for the transport of the cut tire component out of the cutting position to the tire build-up drum, in other words the drum-supply band or conveyor, onto which the tire component that is cut at one end is subsequently placed, has such a length that it can accommodate the entire length of the tire component, in this case a belt ply, that is prescribed essentially by the circumference of the tire. After the necessary belt length is achieved, in the cutting device the second end cut of the tire component is then carried out whereafter the cut tire component is transferred completely to the drum-supply conveyor.

In this connection, the drum-supply conveyor is movable and/or pivotable in its entirety, i.e. with drive devices, band rollers and guide plates for the support of the upper run, and can be moved from a rear cutting and support position in which the drum-supply conveyor is loaded, i.e. in which the cut tire component is fed to the drum-supply conveyor, into an advanced support position in which it is unloaded, i.e. in which the tire component is applied to the tire build-up drum.

In this connection, the drum-supply conveyor, in the rear cutting and support position, is in line with and at the same height as the feed conveyor, so that the tire component can be transferred from the stationary feed conveyor that is disposed within the conveying apparatus.

In the advanced support position, the drum-supply conveyor is then in line with the tire build-up drum and at the same height as the point of application, so that at that location the tire component can be transferred to the tire build-up drum and can be wound thereon.

Thus, for the transfer of the tire component to the tire build-up drum, the drum-supply conveyor moves spatially transverse, generally with the aid of various parallelogram guides, pivot mechanisms and lifting mechanisms, whereby during this movement of the drum-supply conveyor, the (transport) conveyor as such with the tire component placed thereon generally does not move, in other words does not circulate. The circulation of the drum-supply conveyor is again restarted for the transfer of the tire component to the tire build-up drum.

The multiple transfer from one conveyor belt to the following is in this connection a drawback either with regard to the release of material tensions or also produces stretching or bunching in the material, which can be problematic during the later application to the tire build-up drum.

Since with many conventional conveyors the point of application is located at the lower apex of the tire build-up drum, for the transfer of the tire component to the tire build-up drum, where the tire component must be guided to the periphery of the drum in a tangential and overshot manner, it is necessary to provide a short transfer conveyor in the feed line as a further transport device. This is necessary since the drum-supply conveyor can tangentially reach the upper apex of the tire build-up drum with only its lower run; the tire component is, however, flushly supported on the upper run.

Such a transfer conveyor is embodied as a further conveyor belt that adjoins that end region of the drum-supply conveyor that faces the tire build-up drum, and in this connection is somewhat higher than the drum-supply conveyor and overlaps the latter slightly in its end region. The gap that then remains in this end region between the upper run of the drum-supply conveyor and the lower run of the transfer belt is adjustable and essentially corresponds to the thickness of the tire component that is to be applied.

In this connection, the transfer belt is generally also secured to the frame and guide construction of the drum-supply conveyor, and is movable therewith from the rear cutting and support position into the advanced support position.

In the advanced support position, the lower run of the transfer belt is now disposed in the region of the upper apex of the tire build-up drum, i.e. at the point of application, again with a small spacing or gap and essentially tangential thereto. If in this position the drum-supply conveyor and the transfer belt are driven in a circulating manner at the same speed, the tire component that is now advanced on the upper run of the drum-supply conveyor, in the region of the gap between the upper run of the drum-supply conveyor and the lower run of the transfer belt, has its upper surface, due to its natural tackiness, adhered to the lower run of the short transfer belt and thus is tangentially guided in a "suspended" manner to the tire build-up drum, where it is applied. The adhesion to the lower run of the transfer belt can in this connection be aided by, for example, underpressure devices.

During a conveying process, the point of application is also disposed in the lower region of the tire build-up drum, whereby for the transfer of the tire component to the tire build-up drum the drum-supply conveyor can then also be used directly, and the tire component is guided tangentially and in an undershot manner to the periphery of the drum. The direction of rotation of the tire build-up drum, and the support of the tire component upon the drum-supply conveyor, must in this connection of course be appropriately adapted to one another.

For the placement of four rubberized belt plies upon the belt build-up drum of a truck tire manufacturing, there thus results four feed lines and following them respectively four transport lines, all of which must be provided with appropriate transport and cutting devices. Thus, in addition to the already described problems due to the multiple transfers, there of course results an extremely complex structural configuration of the feed and conveying device and a space requirement that considerably exceeds that for the actual tire build-up drum in addition to the auxiliary units. Conveying apparatus for such a multiple support can, in this connection, be provided with feed and transport lines that are disposed parallel to one another, or that are disposed in pairs over one another. The expense for maintenance or repair rises overproportionally in conformity with the complexity of such a layout, so that on the whole an economical manner of operation can be achieved only with very large quantities on a permanent basis.

It is therefore an object of the invention to provide a feed device that permits a number of transport devices, and hence the transfer within a conveying apparatus, to be reduced, which in this connection ensures a support of the tire component that is as planar, linear and free of tension as possible, which can be produced and operated in an economical manner, and the construction of which is easy to integrate into existing tire manufacturing plants.

SUMMARY OF THE INVENTION

The object is realized by the features of the main claim. Advantageous further developments are contained in the dependent claims.

Herewith, within a respective conveying line, the conveying device for the withdrawal of the tire component from the storage means and for the positioning of the tire component in or under the cutting device, and the conveying device for the transport for the cut tire component to the tire build-up drum, are embodied as an interconnected one-piece transport system, preferably as a circulating/continuous conveyor belt, whereby the one-piece transport system is movable and/or pivotable within the conveying apparatus between a rear-cutting and support position, in which the cut tire component is supplied to the one-piece transport system, and an advanced support position in which the tire component is applied to the tire build-up drum, whereby the feed devices are disposed and/or movable relative to the one-piece transport system in such a way that in its rear cutting and support position the one-piece transport system is respectively in operative connection with a cutting device, and whereby the feed device and the one-piece transport system are provided with holding or fixing devices for the tire component which are movable to the tire component and are disposed in the region of the cutting device, and which during the movement and/or pivoting of the one-piece transport system temporarily fix in position not only the tire component that is withdrawn from the storage means and that after the cutting remains on the side of the storage means relative to the line of cut, but also the tire component already transferred to the one-piece transport system.

As a consequence of such a configuration of the feed device, it is possible to hold the tire component that remains on the side of the storage means after the cut in position without it being necessary to have a support on one of the conveyor belts. This enables a construction of the conveying apparatus with which the feed belt and the drum-supply conveyor are embodied as a one-piece transport system that is movable between a rear cutting and support position and an advanced support position and is thus moved into the region of the feed device only for the loading or unloading of the tire component, and in this region carries the entering tire component.

Thus, a separate feed belt is no longer necessary, as a result of which in each conveying line one of the critical material transfers from one conveyor belt to the following is eliminated.

This furthermore results in the important advantage that a drum-supply conveyor, in other words a one-piece transport system, can be combined with a plurality of feed devices, whereafter the drum-supply conveyor can then be moved into various rear cutting and support positions, where various tire components, in other words for example different belt plies can then be cut and applied. Since in this case only one one-piece transport device, namely the drum-supply conveyor, can be used for a plurality of feed devices, the critical transfer locations are further drastically reduced.

The feed device is advantageously embodied in such a way that for the tire component that after the cut remains on the side of the storage means relative to the line of cut, the holding or fixing device, and the cutting device, are disposed within a lifting device that is associated with the feed device, with which lifting device the holding or fixing device, the cutting device, and the temporarily fixed tire component are movable into a position above the plane of the upper run of the circulating/continuous conveyor belt of the one-piece transport system.

As a result of such a configuration, the introduction of the drum-supply conveyor into the rear cutting and support position is facilitated to the extent that the guides, the drive mechanisms, and the pivot mechanisms for achieving this position can be embodied within normal tolerances, since during the introduction into the rear cutting and support position the holding or fixing device and the cutting device can be moved with the tire component into a reliable and spaced lifting position from which the tire component and the mentioned devices can then be lowered onto the drum-supply conveyor that is disposed in the rear cutting and support position.

In particular with the use of tire components that are provided with metallic load carrying means, in other words, for example, with rubberized belt plies, pursuant to one advantageous embodiment, the holding or fixing device for the tire component that after the cut remains on the side of the storage means relative to the line of cut comprises a pressure plate, which is disposed above the tire component, and a magnetic plate that is disposed above the pressure plate and is movable to the pressure plate or the tire component, whereby the magnetic plate fixes the tire component on the pressure plate.

Such magnetic plates can comprise permanent magnets, so that it is not necessary to have an additional supply of electrical energy; the magnetic plates can also be provided with electro magnets that can be switched on.

Pursuant to a further advantageous embodiment, for the tire component that after the cut remains on the side of the storage means relative to the line of cut, the holding or fixing device comprises an apertured or air-permeable pressure plate that is disposed above the tire component and is movable to the tire component, and a vacuum device that is disposed above the pressure plate and could be movable to the pressure plate or the tire component, whereby the vacuum device fixes the tire component on the pressure plate.

With such a device, it is also easy to fix tire components that contain no metallic inserts, in other words, for example, textile-reinforced plies or rubber plies without any reinforcement.

For such types of tire components that can receive the distributed, point-type holding fixture without influencing the further processing, pursuant to a further advantageous embodiment, for the tire component that after the cut remains on the side of the storage means relative to the line of cut, the holding or fixing device comprises a plurality of needles or rods that are disposed on a base plate and extend through the one-piece transport system, whereby the base plate, which is provided with needles, is disposed below the one-piece transport system.

In this connection, with a sufficient number of needles, one achieves only a minimal penetration of the needle points into the material, whereby the thereby resulting, small impressions are again closed by the later vulcanization.

The drum-supply conveyor can, for example, in this connection be embodied in such a way that it comprises a plurality of narrow conveyor belts that are disposed next to one another, so that the needles extend through into the intermediate spaces into the one-piece transport system and can support the tire component.

The already described advantages of a holding or fixing by magnetic force for tire components having metallic load-carrying means can also result in a further embodiment according to which, for the tire component already transferred to the one-piece transport system, the holding or fixing device is embodied as a magnetic plate that is disposed between the upper run and the lower run of the one-piece transport system, which is embodied as a circulating/continuous conveyor belt and is movable to the upper run or the tire component.

As a consequence of the arrangement of such a magnetic plate between the upper run and the lower run of the one-piece transport system, and in the region of the cutting device, i.e. in the rear portion of the drum-supply conveyor, which upon reaching the rear cutting end support position is disposed below or within the feed device, it is also possible here in a relatively straightforward manner to effect a fixing of the tire component, especially during the cutting process.

With the feeding of tire components that contain no metallic load-carrying means, in other words, for example, with textile reinforced rubberized components, as already with the holding or fixing device within the lifting device, pursuant to an advantageous embodiment for the tire component already transferred to the one-piece transport system, the holding or fixing device is embodied as a vacuum device that is disposed between the upper run and the lower run of the one-piece transport system, which is embodied as a circulating/continuous and possibly air-permeable conveyor belt, and could be movable to the upper run or to the tire component.

Pursuant to a further advantageous embodiment, the feed device is provided with a guiding and conducting device for the tire component withdrawn from the storage means that is movable with the lifting device and is embodied as a roller system.

As a consequence of such a guiding and conducting device, which is connected with the lifting device, one already avoids during the introduction of the tire component undesirable stretching and tensioning that could result during a frequent movement or alteration of the curvature of the entering tire component.

BRIEF DESCRIPTION OF THE DRAWINGS

The invention will be described in greater detail with the aid of one specific embodiment. Shown are.

DESCRIPTION OF PREFERRED EMBODIMENTS

Figure 1A:
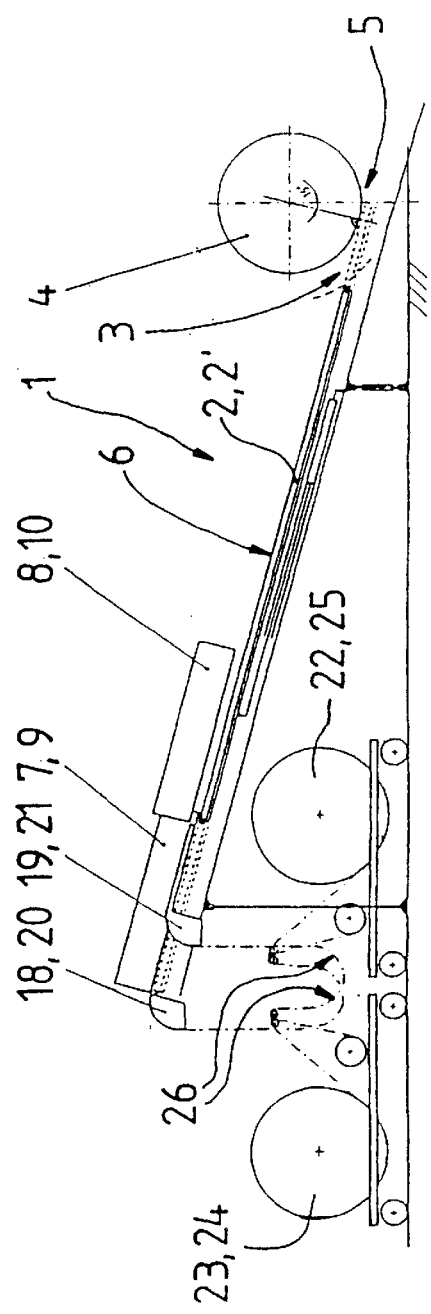
FIG. 1a a simplified illustration of a conveying apparatus having an inventive feed device, FIG. 1b a top view of the conveying apparatus of FIG. 1a with the inventive feed device, FIGS. 2a+2b with the aid of a drawing showing the principle, the various operating steps A1 to A15 of the feed device during an operating cycle.
Figure 1B:
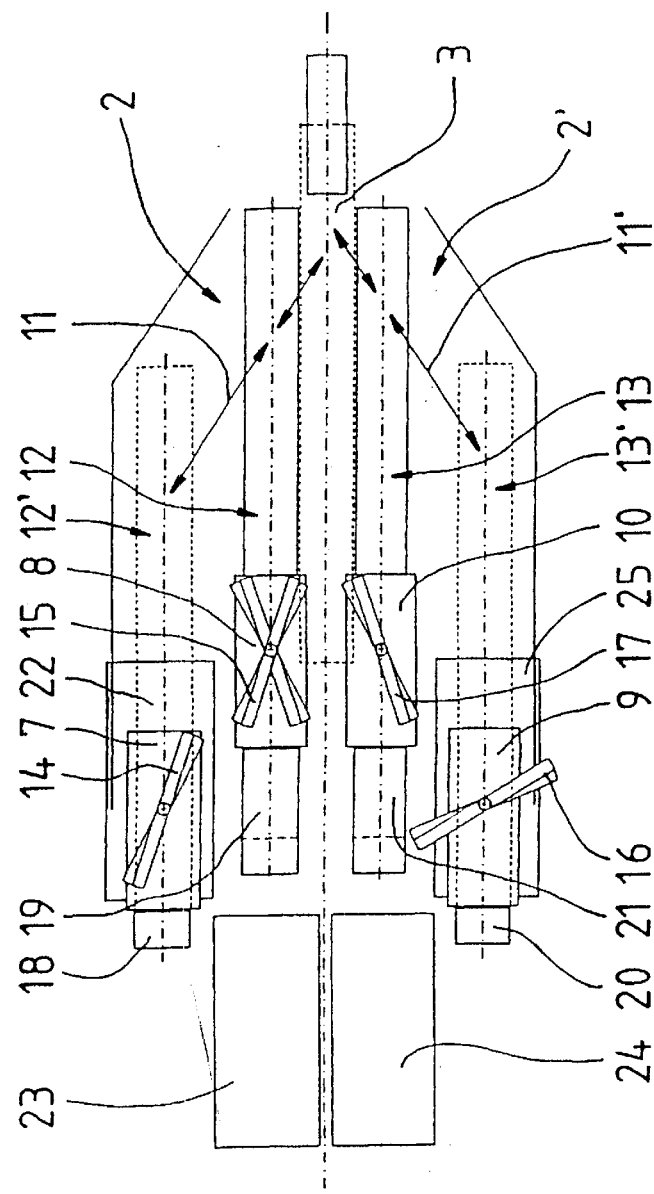

The views of FIGS. 1a and 1b show a conveying apparatus 1 with which the drum-supply conveyer 2,2', which is embodied as a one-piece transport system, in its advanced support position 3 travels to a point of application 5 that is disposed in the lower region of the tire build-up drum 4, whereby so that the drum-supply conveyor can be used directly to transfer the tire component 6, which is supported on the drum-supply conveyor, is here not illustrated in detail, and is provided with metallic reinforcing elements, the tire component is thus guided tangentially and in an undershot manner to the periphery of the tire build-up drum 4.

Such a conveying apparatus is also designated as a "Bottom Belt Servicer", and in this connection is provided with four different, inventive feed devices 7 to 10, which are disposed stationarily in the rear to middle region of the conveyor.

The two drum-supply conveyors 2,2', within the inclined plane defined by them, are movable in the directions 11 and 11' at an angle between the advanced support position 3 and respectively two rear-cutting and support positions 12, 12' and 13,13', whereby the drum-supply conveyors, in the rear cutting and support positions, respectively enter with their rear portion in the region, or below, the feed devices 7,8 as well as 9 and 10.

In this connection, the feed devices are respectively provided with cutting devices 14 to 17, which are embodied as roller-type blades that run on a cutting rail, and cut the tire component, i.e. in this case the different belt plies, in respectively different angles at the beginning and at the end.

The feed devices furthermore respectively have guiding and conducting devices 18 to 21 via which the tire component, which is stored in rolls within the storage modules 22 to 25, can be withdrawn.

In this connection, the storage modules are disposed in the rear part of the conveyor and partially below the remaining devices, so that the overall machine requires as little floor space as possible. Provided between the storage modules and the feed devices or conveying devices are compensation loops 26 of the material or tire component that compensate for speed differences between the roller drive, the storage rollers and the conveying device, and prevent material tensioning.

From FIGS. 2a and 2b, one can recognize in the form of a drawing showing the principle the manner of operation of the inventive feed device in conjunction with the drum-supply conveyor with the aid of the operating steps A1 to A15, which are necessary for the withdrawal of the tire component from the storage means, the cutting, and the subsequent placement upon the tire build-up drum. Involved here is a feed device that serves for the support of tire components 6 that are provided with metallic reinforcing elements and is therefore embodied in the simplest manner with holding and fixing devices in the form of magnetic plates.

In operating step Al, the drum-supply conveyor 2 is retracted into its rear cutting and support position, with the rear end being disposed in the region of the feed device 7 and below the cutting device 15 or below a lifting device 27, in or on which are disposed the cutting device 15, a displaceable pressure plate 28, an upper magnetic plate 29 as well as the guiding and conducting device 18.

Disposed on the upper run of the drum-supply conveyor 2, which is embodied as a circulating conveyor belt, is a cutting strip 30 that is here not illustrated in detail and that during the cutting of the tire component 6 is disposed between the tire component and the conveyor belt, so that the movable roller-type blade 31 can cut only into the tire component, but not into the conveyor belt.

In operating step A2, by driving the drum-supply conveyor 2 the tire component 6 is conveyed onto the drum-supply conveyor in an appropriate length that is prescribed by the circumference of the tire build-up drum, with the tire component being withdrawn from the here not-illustrated storage means.

In this connection, the drum-supply conveyor 2 is provided in its forward and central region with fixed magnets 32 that engage below the upper run, and in its rear region is provided with a lower magnetic plate 33 that is displaceable relative to the upper run or the tire component. During the transport of the tire component that is effected in the operating step A2, the pressure plate 28 and the upper magnetic plate 29 are raised, and the lower magnetic plate 33 is displaced to the upper run of the drum-supply conveyor 2 or the tire component, so that the tire component 6 that is to be loaded is fixed on the drum-supply conveyor and can be transported without slippage.

In the operating step A3, the roller-type blade 31 moves into its cutting position and via a transverse or inclined cut separates the tire component 6 into an appropriately cut to length portion 6' for placement upon the tire build-up drum and into a tire component 6" that after the cutting, relative to the cutting line remains on the side of the storage means. Thereafter, the roller-type blade 31 returns to its position of rest, as illustrated in the operating step A4.

In this operating step, the pressure plate 28 is also fed to the tire component 6" that remains on the side of the storage means, whereafter in operating step A5 the lower magnetic plate 33 is retracted or lowered from its position below the upper run of the drum-supply conveyor, in other words, out of the vicinity of the tire component.

In the operating step A6, the upper magnetic plate 29 of the pressure plate 28 is then moved toward the tire component 6" whereafter in the operating step A7 the entire lifting device 27 is first raised by about 5 mm, so that the tire component 6" that is now fixed on the pressure plate is released from the upper run of the drum-supply conveyor 2. The drum-supply conveyor can now again be driven, as a result of which the cut to length tire component 6' is conveyed further, and the rear end thereof is removed from the region of the cutting device and of the roller-type blade.

In operating step A8 there is then effected the full lifting of the lifting device 27 together with the tire component 6" fixed on the pressure plate 28 by the magnetic effect of the magnetic plate 29 to about 50 mm above the upper run of the drum-supply conveyor 2. The tire component 6" is thereby entirely reliably fixed and in smooth contact relative to the pressure plate, thereby avoiding any tension and material expansion. This is further enhanced in that the guiding and conducting device 18 is also moved along with the lifting device.

In the operating step A9, the entire drum-supply conveyor 2, which is embodied as a one-piece transport system, now moves, with all of the drive and roller devices, into its advanced support position 3, in which the tire component 6' is applied to the tire build-up drum.

After placement of the tire component 6' upon the tire build-up drum, the drum-supply conveyor 2 returns to its rear cutting and support position 12 and into the region of the feed device 7, as shown in the operating step A10. In the operating step A11, the lifting device 27 is again lowered, so that the tire component 6", which is still fixed on the pressure plate 28 with the aid of the upper magnetic plate 29, again comes to rest upon that portion of the drum-supply conveyor 2 that is disposed in the region of the feed device 7.

In the operating step A12, the upper magnetic plate 29, which previously was advanced to the pressure plate 28 and the tire component 6", is then raised, resulting in the release of the fixation to the pressure plate.

In the operating step A13, the lower magnetic plate 33 is again advanced to the upper run of the drum-supply conveyor 2 and at the same time to the tire component 6", as a result of which the tire component 6" is fixed on the upper run of the drum-supply conveyor 2.

In the operating step A14, also the pressure plate 28, together with the magnetic plate 29, are raised within the lifting device 27, i.e. without having to activate the lifting device 27 itself. The tire component 6" is now entirely fixed upon the upper run of the drum-supply conveyor, and is also movable therewith, whereupon in operating step A15, merely a brief retraction of the tire component 6' is effected so that a separation from the cutting strip 30, upon which the tire component was supported during the tire fixation within the feed device, can be carried out, whereafter an advancing and loading of the drum-supply conveyor 2 is again effected with the operating step A1 and A2.

The specification incorporates by reference the disclosure of German priority document 199 38 149.6 filed Aug. 16, 1999, and International priority document PCT/EP00/07944 filed Aug. 16, 2000.

The present invention is, of course, in no way restricted to the specific disclosure of the specification and drawings, but also encompasses any modifications within the scope of the appended claims.

| Reference Numeral List | |
|---|---|
| 1 | Conveying Apparatus |
| 2,2' | Drum-Supply Conveyor |
| 3 | Advanced Support Position |
| 4 | Tire build-up Drum |
| 5 | Point of application |
| 6 | Tire component |
| 6' | Cut to length tire component |
| 6" | Tire component remaining on the side of the storage means |
| 7–10 | Feed device |
| 11,11' | Direction of travel |
| 12,12' 13,13' | Rear cutting and support position |
| 14–17 | Cutting device |
| 18–21 | Guiding and conducting device |
| 22–25 | Storage modules |
| 26 | Compensation Loop |
| 27 | Lifting device |
| 28 | Pressure plate |
| 29 | Upper magnetic plate |
| 30 | Cutting strip |
| 31 | Roller-type blade |
| 32 | Fixed magnets |
| 33 | Lower magnetic plate |

What is claimed is:

1. A feed device for strip-shaped tire components within a conveying apparatus for a tire build-up drum, whereby successively placed and rolled onto the tire build-up drum are a plurality of plies of different or differently pre-treated, essentially strip-shaped tire components that are bonded to the already applied materials, whereby said conveying apparatus is provided with at least one storage means, as well as appropriate pertaining ones of the feed devices for the tire components, as well as at least one cutting device associated with said feed devices for cutting said strip-shaped tire components to length, whereby said conveying apparatus is furthermore provided with at least one conveying line/conveying path in which cut tire components are conveyed to said tire build-up drum, further comprising:

within a respective conveying line, an interconnected, one-piece transport system composed of a conveying device for withdrawing tire components from said storage means and for positioning said tire components in or under said cutting devices, and a conveying device for transporting said cut tire components to said tire build-up drum, wherein said one-piece transport system is movable within said conveying apparatus between a rear cutting and support position in which a cut tire component is supplied to said one-piece transport system, and an advanced support position, in which said tire component is applied to said tire build-up drum, wherein said feed devices are disposed and, as appropriate, are movable relative to a respective one of said one-piece transport system in such a way that in its rear cutting and support position said one-piece transport system is respectively operatively connected with a cutting device, wherein said feed devices and said one-piece transport system are provided with holding or fixing devices for said tire component that are movable to said tire component and are disposed in the region of said cutting devices, wherein during movement of said one-piece transport system, said holding or fixing devices temporarily fix in position not only said tire component that is withdrawn from the storage means and that after a cutting remains on the side of the storage means relative to a line of cut, but also a tire component already transferred to said one-piece transport system, whereby for the tire component that after a cutting remains on the side of the storage means, the holding or fixing device, and the cutting devices, are disposed within a lifting device that is associated with said feed devices, and wherein with said lifting device, said holding or fixing devices, said cutting devices, and said temporarily fixed tire component are movable into a position above a plane of an upper run of a conveyor belt of said one-piece transport system.

2. A feed device according to claim 1, wherein said one-piece transport system is embodied as a circulating/continuous conveyor belt.

3. A feed device according to claim 1, wherein for said tire component that after a cutting remains on the side of the storage means relative to a line of cut, said holding or fixing device comprises a pressure plate that is disposed above said tire component and is movable to said tire component, and also comprises a magnetic plate that is disposed above said pressure plate and is movable to said pressure plate or said tire component, whereby said tire component is fixable on said pressure plate with the aid of said magnetic plate.

4. A feed device according to claim 1, wherein for said tire component that after a cutting remains on the side of the storage means relative to a line of cut, said holding or fixing device comprises an apertured or air-permeable pressure plate, which is disposed above said tire component and is movable to said tire component, and also comprises a vacuum device that is disposed above said pressure plate and is movable to said pressure plate or said tire component, whereby said tire component is fixable to said pressure plate with the aid of said vacuum device.

5. A feed device according to claim 1, wherein for said tire component that after a cutting remains on the side of the storage means relative to a line of cut, said holding or fixing device comprises a plurality of needles that are disposed on a base plate and extend through said one-piece transport system, whereby said base plate is disposed below said one-piece transport system.

6. A feed device according to claim 1, wherein for said tire component that is already transferred to said one-piece transport system, said holding or fixing device is embodied as a magnetic plate that is disposed between an upper run and a lower run of said one-piece transport system, which is embodied as a circulating/continuous conveyor belt, wherein said magnetic plate is movable to said upper run or said tire component.

7. A feed device according to claim 1, wherein for said tire component that is already transferred to said one-piece transport system, said holding or fixing device is embodied as a vacuum device that is disposed between an upper run and a lower run of said one-piece transport system, which is embodied as a circulating/continuous and possibly air-permeable conveyor belt, and is movable to said upper run or said tire component.

8. A feed device according to claim 1, wherein said feed device is provided with a guiding and conducting device for said tire component withdrawn from said storage means, wherein said guiding and conducting device is movable with said lifting device.

9. A feed device according to claim 8, wherein said guiding and conducting device is embodied as a roller system.

* * * * *

UNITED STATES PATENT AND TRADEMARK OFFICE
CERTIFICATE OF CORRECTION

PATENT NO. : 6,695,949 B1  Page 1 of 1
DATED : February 24, 2004
INVENTOR(S) : Jungk et al.

It is certified that error appears in the above-identified patent and that said Letters Patent is hereby corrected as shown below:

<u>Title page, Item [54] and Column 1, lines 1-2,</u>
Title, should read as follows: FEED DEVICE FOR STRIP-SHAPED TIRE COMPONENTS --

Signed and Sealed this

Fourth Day of May, 2004

JON W. DUDAS
*Acting Director of the United States Patent and Trademark Office*